United States Patent
Wu

(10) Patent No.: US 11,704,949 B2
(45) Date of Patent: Jul. 18, 2023

(54) USER VERIFYING BICYCLE CONTROL SYSTEM AND USER VERIFICATION METHOD THEREOF

(71) Applicant: SINBON ELECTRONICS COMPANY LTD., New Taipei (TW)

(72) Inventor: Chen-Yu Wu, New Taipei (TW)

(73) Assignee: SINBON Electronics Company Ltd., New Taipei (TW)

( * ) Notice: Subject to any disclaimer, the term of this patent is extended or adjusted under 35 U.S.C. 154(b) by 148 days.

(21) Appl. No.: 17/381,403

(22) Filed: Jul. 21, 2021

(65) Prior Publication Data

US 2023/0022298 A1   Jan. 26, 2023

(51) Int. Cl.
| G07C 9/00 | (2020.01) |
| B62J 45/411 | (2020.01) |
| B62J 45/412 | (2020.01) |
| B62H 5/00 | (2006.01) |
| H04L 67/12 | (2022.01) |

(52) U.S. Cl.
CPC ........... G07C 9/00571 (2013.01); B62H 5/00 (2013.01); B62J 45/411 (2020.02); B62J 45/412 (2020.02); G07C 9/00896 (2013.01); H04L 67/12 (2013.01)

(58) Field of Classification Search
CPC ....................................................... B62M 6/45
See application file for complete search history.

(56) References Cited

U.S. PATENT DOCUMENTS

2020/0262510 A1*   8/2020   Hahn ....................... B62M 6/55

FOREIGN PATENT DOCUMENTS

| CN | 108622296 A | 10/2018 |
| DE | 102012217775 A1 | 4/2014 |
| EP | 2514658 B1 | 10/2012 |
| TW | I457793 B | 10/2014 |
| TW | 201710142 A | 3/2017 |
| TW | I667926 B | 8/2019 |
| TW | 202037524 A | 10/2020 |
| TW | 202041405 A | 11/2020 |
| TW | I722111 B | 3/2021 |
| TW | I723021 B | 4/2021 |
| TW | M618606 U | 10/2021 |
| WO | 2020202343 A1 | 10/2020 |

OTHER PUBLICATIONS

International Patent Office Official Action issued by Foreign Patent Office for corresponding Application No. 110121983/11120271160.
International Patent Office Official Action issued by Foreign Patent Office on Jan. 12, 2022 for corresponding Application No. 21187140.5-1009.

* cited by examiner

*Primary Examiner* — K. Wong
(74) *Attorney, Agent, or Firm* — Rosenberg, Klein & Lee

(57) ABSTRACT

Provided are a user verifying bicycle control system and a user verification method thereof, including a sensing module and a control module installed on a bicycle. The sensing module obtains a torque signal and an angle signal from a crank sensing component, further obtains a speed signal from a speed sensing unit, and outputs the torque signal, the angle signal, and the speed signal to the control module; the control module assembles the torque signal, the angle signal, and the speed signal into a signal sequence as a key to verify a user identity for the bicycle.

15 Claims, 9 Drawing Sheets

| PATTERN ID | SEGMENT ID | ALGORITHM | DIRECTION | THRESHOLD |
|---|---|---|---|---|
| P1 | S11 | ANY VALUE | POSITIVE | 10 NM |
| P1 | S31 | AVERAGING | NEGATIVE | 5 KM/H |
| P2 | S12 | AVERAGING | POSITIVE | 20 NM |
| P3 | S23 | ACCUMULATION | POSITIVE | 720 DEGREES |
| P4 | S34 | AVERAGING | POSITIVE | 8 KM/H |

FIG.6

USER VERIFYING BICYCLE CONTROL SYSTEM AND USER VERIFICATION METHOD THEREOF

BACKGROUND OF THE INVENTION

1. Field of the Invention

The present invention relates to a user verifying bicycle control system and a user verification method thereof, particularly to a user verification method that verifies a user identity by matching a signal sequence assembled by a torque signal, a speed signal, and an angle signal of a crank of a bicycle sensed from the user.

2. Description of the Related Art

For years, bicycles have been popular and widely accepted among different age groups both as transportation and as exercise equipment. In recent years, due to an expansion in shared bicycles and electric bicycles, bicycles as a whole further gain popularity. To prevent bicycle theft, a user verification is an important aspect for a bicycle regardless of being privately owned or shared.

In the past, a user utilizes a numeric pad or a biometric module to input a password to unlock a bicycle. The password can be verified by whether the password entered by the user matches a default key code, and if the two match, the bicycle is unlocked. Since the default key code can be easily cracked, the default key code requires frequent updating. However, updating and safeguarding the default key code creates logistical and management difficulties, and the user struggles to memorize different passwords as well. The biometric module verifies the user's identity by scanning and matching biometrics such as finger prints, facial features, or iris patterns. Compared to traditional locking systems, the biometric module is much safer and much harder to be cracked. However, an integration of the biometric module to a bicycle is both costly and poses technical difficulties, and therefore is hard to be widely adopted.

Due to the aforementioned reasons, the user verification for both bicycles and electric bicycles suffer problems with either low protection effectiveness or high integration cost.

SUMMARY OF THE INVENTION

The present invention provides a user verifying bicycle control system and a user verification method thereof, wherein a user verification can be achieved by matching a signal sequence assembled by a torque signal, a speed signal, and an angle signal sensed from the user by an already integrated sensor.

To implement the aforementioned user verification method, the user verifying bicycle control system of the present invention includes a sensing module and a control module; wherein, the sensing module includes:
a first processing unit;
a crank sensing component, connecting with the first processing unit for sensing a torque and/or an angle of a crank of a bicycle;
a speed sensing unit, connecting with the first processing unit for sensing a bicycle speed to obtain a speed signal, and outputting the speed signal to the first processing unit;
the sensing module connects with the control module, and provides multiple sensing signals to the control module;

the control module receives the sensing signals from the sensing module, and assembles the sensing signals to form a signal sequence;

the signal sequence mainly consists of at least one signal segment combination, and each signal segment combination includes at least one signal segment with characteristics; the sensing signals assembled into the signal sequence include senses of the torque and/or the angle of the crank from the crank sensing component; and the control module uses the signal sequence as a key for verifying; the control module matches characteristics of the at least one signal segment in the at least one signal segment combination to verify a user identity.

A user verification method for the user verifying bicycle control system of the present invention includes the following steps:

receiving multiple sensing signals within a time period;
dissecting each of the sensing signals into multiple signal segments;
assembling at least one of the multiple signal segments to form at least one signal segment combination; and
matching characteristics of the at least one signal segment in the at least one signal segment combination to verify a user identity; wherein the sensing signals include senses of a torque and/or an angle of a crank of a bicycle from a crank sensing component electrically connected to the control module.

The present invention uses the sensing module of the user verifying bicycle control system to obtain the sensing signals such as the torque signal, the speed signal, and the angle signal. The sensing signals are then outputted to the control module where the sensing signals are dissected into the signal segments and assembled into the signal segment combination as a key of user verification. Since the sensing signals are obtained from sensors often already implemented on bicycles, implementation cost for the user verifying bicycle control system is low, and implementation of the user verifying bicycle control system poses minimal technical difficulties. Further, since the combination of and the amount of the sensing segments in the signal segment combination are both determined and configured from the user, the user verifying bicycle control system and the user verification method thereof is safer and hard to be cracked. The present invention brings forth lower implementation cost and better protection for the bicycle, and therefore the present invention can be widely adopted.

BRIEF DESCRIPTION OF THE DRAWINGS

FIG. 6 is a parameter perspective view of the signal segment combination of the present invention.

DETAILED DESCRIPTION OF THE INVENTION

The present invention provides a user verifying bicycle control system and a user verification method thereof. A present embodiment of a user verifying bicycle control system, as shown in FIG. 1, includes a sensing module 10 and a control module 20.

Figure 1:
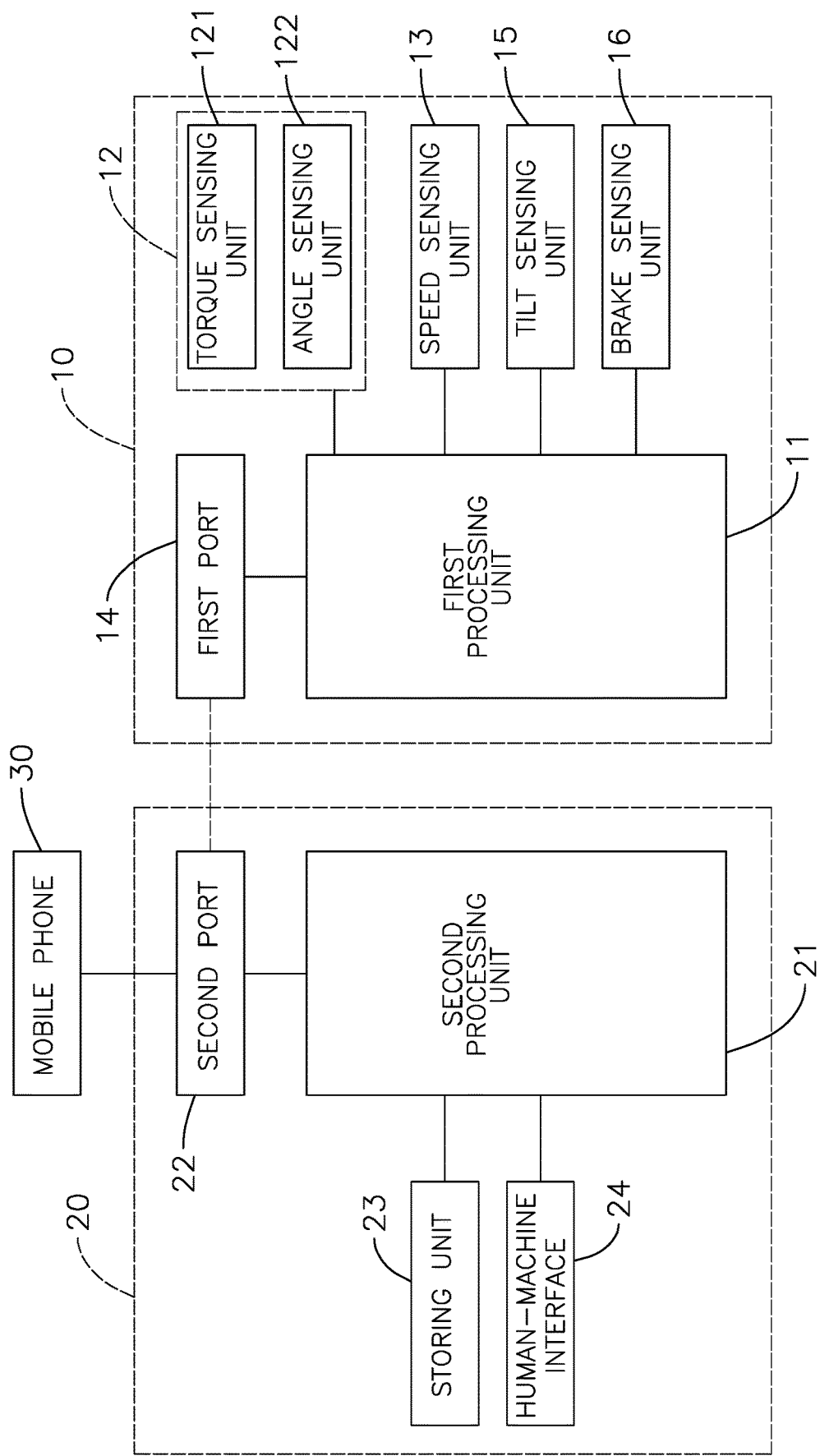
FIG. 1 is a block diagram of a user verifying bicycle control system of the present invention.

With reference to FIG. 1, the sensing module 10 includes a first processing unit 11, a crank sensing component 12, and a speed sensing unit 13. The crank sensing component 12 is installed beside a crank of a bicycle, for sensing a torque and/or an angle of the crank. In the present embodiment, the crank sensing component 12 includes a torque sensing unit 121 and an angle sensing unit 122. The torque sensing unit 121 and the angle sensing unit 122 each respectively connect with the first processing unit 11, for accordingly providing the first processing unit 11 with a torque signal and an angle signal of the crank. The speed sensing unit 13 is also connected with the first processing unit 11. The speed sensing unit 13 obtains a speed signal from sensing a bicycle speed of the bicycle, and the speed sensing unit 13 outputs the speed signal to the first processing unit 11.

The sensing module 10 is connected with the control module 20. The sensing module 10 and the control module 20 can either be combined to work as one device, or be separated and work independently as separate devices installed on different parts of the bicycle. In the present embodiment, the sensing module 10 and the control module 20 are independent devices. The sensing module 10 further includes a first port 14. The first port 14 uses either wired or wireless protocols to connect with the first processing unit 11, making the first port 14 a communication interface between the sensing module 10 and the control module 20.

The above details basic components of the sensing module 10. The sensing module 10 can further include a tilt sensing unit 15 and a brake sensing unit 16. The tilt sensing unit 15 includes device such as a gyroscope, for detecting a posture of the bicycle. The brake sensing unit 16 detects whether the bicycle is using its brakes. Both the tilt sensing unit 15 and the brake sensing unit 16 connect with the first processing unit 11.

The sensing module 10 receives multiple sensing signals from each sensing component from the first processing unit 11, and then the sensing module 10 outputs the sensing signals from the first port 14 to the control module 20. The control module 20 receives the sensing signals from the sensing module 10, and assembles the sensing signals to form a signal sequence. The signal sequence mainly consists of at least one signal segment combination, and each signal segment combination includes at least one signal segment with characteristics. The sensing signals assembled into the signal sequence include senses of the torque and/or the angle of the crank from the crank sensing component 12.

The control module 20 includes a second processing unit 21, a storing unit 23, and a human-machine interface 24. The storing unit 23 and the human-machine interface 24 each connect with the second processing unit 21. When the control module 20 combines with the sensing module 10, the second processing unit 21 and the first processing unit 11 of the sensing module 10 can be integrated into an independent processing unit. In the present embodiment, the control module 20 and the sensing module 10 are independent. The control module 20 further includes a second port 22, wherein the second port 22 is compatible with the first port 14 of the sensing module 10, making up the communication interface between the control module 20 and the sensing module 10. The second processing unit 21 receives the sensing signals output from the first processing unit 11 through the second port 22, and after processing, the second processing unit 21 generates a verification key. The verification key is used to verify a user identity by matching with a verification data stored and defaulted in the storing unit 23. The second port 22 is also connectable with a mobile phone 30. In other words, the control module 20 uses the signal sequence as a key for verifying. The control module 20 matches characteristics of the at least one signal segment in the at least one signal segment combination to verify a user identity.

In the present embodiment, the storing unit 23 has non-volatile memory (NVM). The human-machine interface 24 provides a user to configure the verification data, and the human-machine interface 24 can either be an integrated device in the control module 20, or an external device. When the control module 20 is connected with the mobile phone 30, the human-machine interface 24 therefore includes a touch screen, a voice input and/or at least one button of the mobile phone 30.

Figure 2:
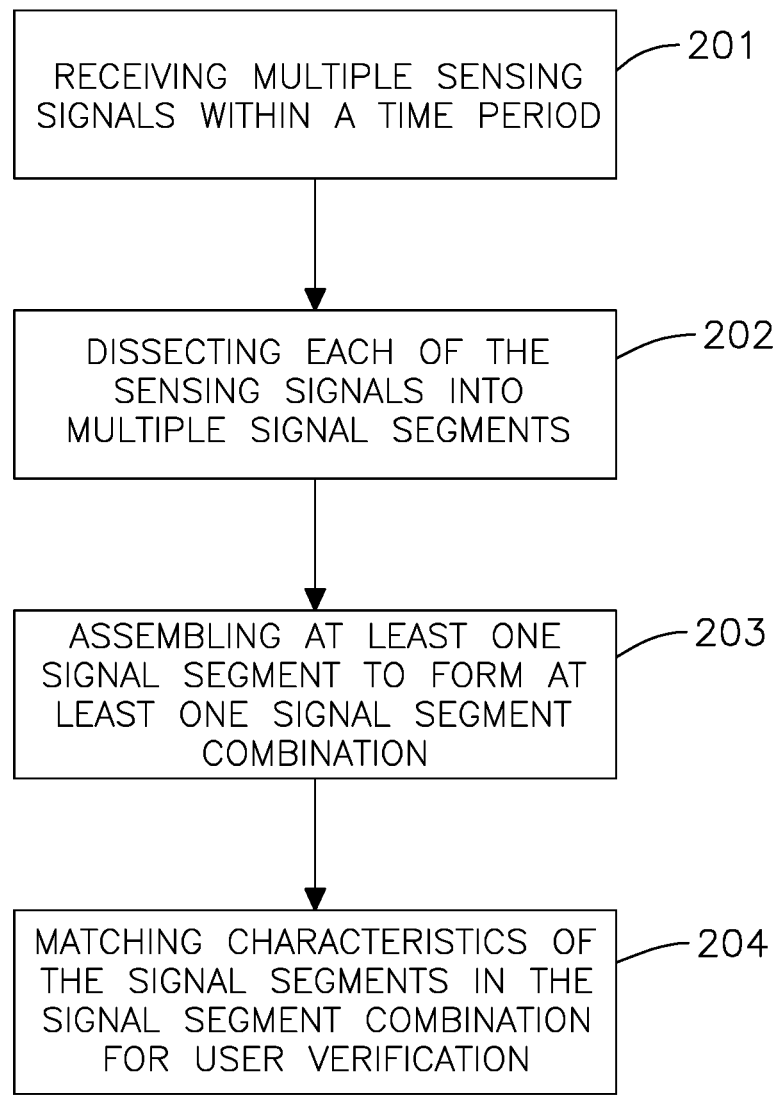
FIG. 2 is a flow chart of a user verification method of the present invention.

With reference to FIG. 2, the following details how the control module 20 generates the verification key needed to verify a user identity. A user verification method for the user verifying bicycle control system of the present invention includes the following steps:

Step 201: receiving multiple sensing signals within a time period.

Step 202: dissecting each of the sensing signals into multiple signal segments.

Step 203: assembling at least one of the multiple signal segments to form at least one signal segment combination.

Step 204: matching characteristics of the at least one signal segment in the at least one signal segment combination to verify the user identity.

The control module 20 executes the above steps to verify the user identity. Before matching a verification data to verify the user identity, the verification data needs to be defaulted in a configuration mode for configuring an amount of the sensing signals used and an amount of the signal segments used for the verification data. The amount of the sensing signals used refers to an amount of signal sources used, in other words, the amount of different types of the sensing signals used. The configuration mode will be mentioned in later parts of the explanation. In the present embodiment, three sensing signals and four signal segment combinations are chosen for configuring the verification data.

Figure 3:
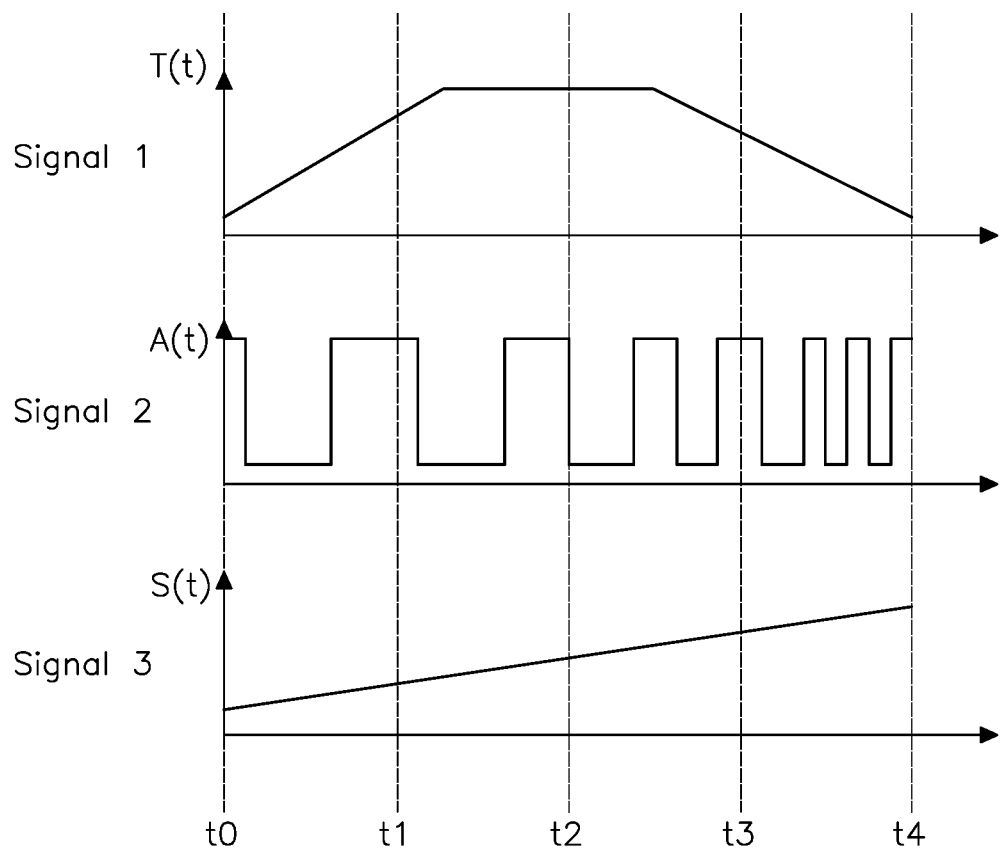
FIG. 3 is a signal diagram of multiple sensing signals of the present invention.

With reference to FIG. 3, in Step 201, the control module 20 receives three sensing signals through the sensing module 10 in a time period from t0 to t4. The three sensing signals include: the torque signal of the crank represented as Signal 1 in FIG. 3, the angle signal of the crank represented as Signal 2 in FIG. 3, and the speed signal represented as Signal 3 in FIG. 3. The torque signal is in the unit of Newton meter (Nm), the angle signal is in the unit of degrees, and the speed signal is in the unit of kilometer per hour (km/h). During the period from t0 to t4, the torque signal first increases to a constant value before decreasing to zero, and the angle signal switches between a high value and a low value. Each time the angle signal switches between the high value and the low value, the crank is turned 10 degrees in its rotating direction respectively.

Figure 4:
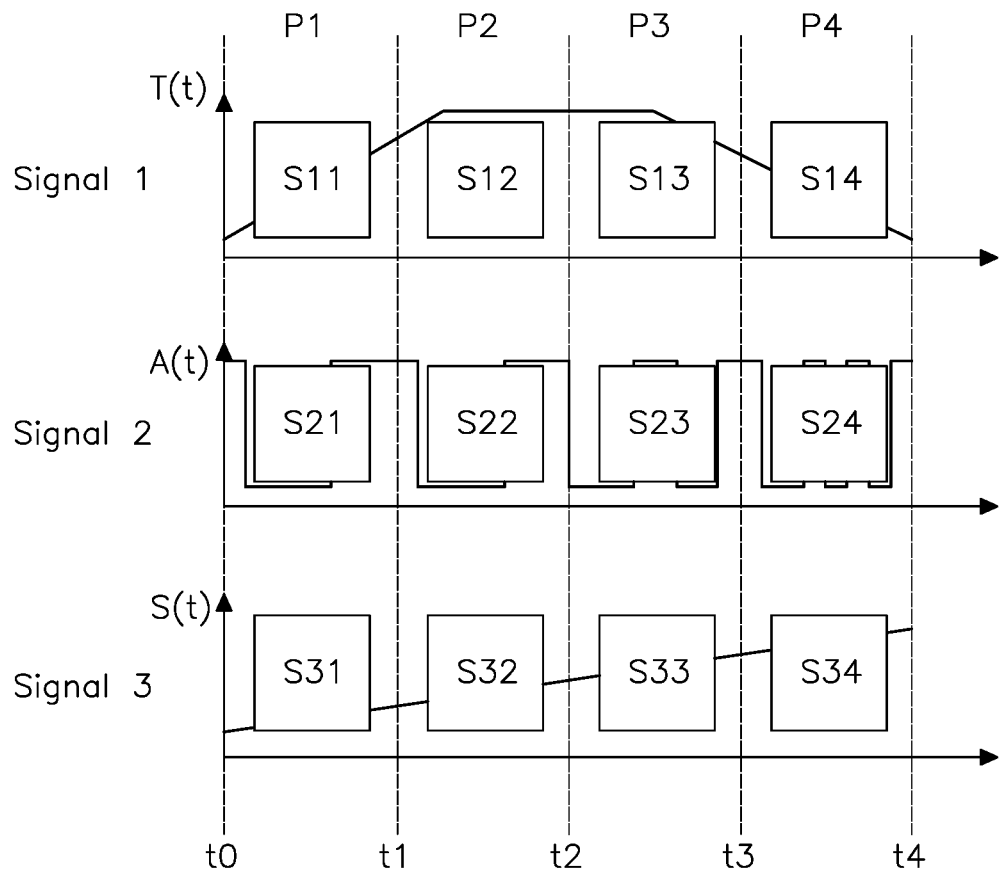
FIG. 4 is a perspective view of how the sensing signals are dissected into signal segments in the present invention.

With reference to FIG. 4, in Step 202, after the control module receives the three sensing signals, during the period from t0 to t4, the three signals are dissected into four signal segments. In other words, Signal 1, Signal 2, and Signal 3 are dissected into S11 to S14, S21 to S24, and S31 to S34 as a total of twelve signal segments as shown in FIG. 4. Then in Step 203, the control module 20 forms at least one signal segment combination and each of the at least one signal segment combination has at least one signal segment that can be characterized.

Figure 5:
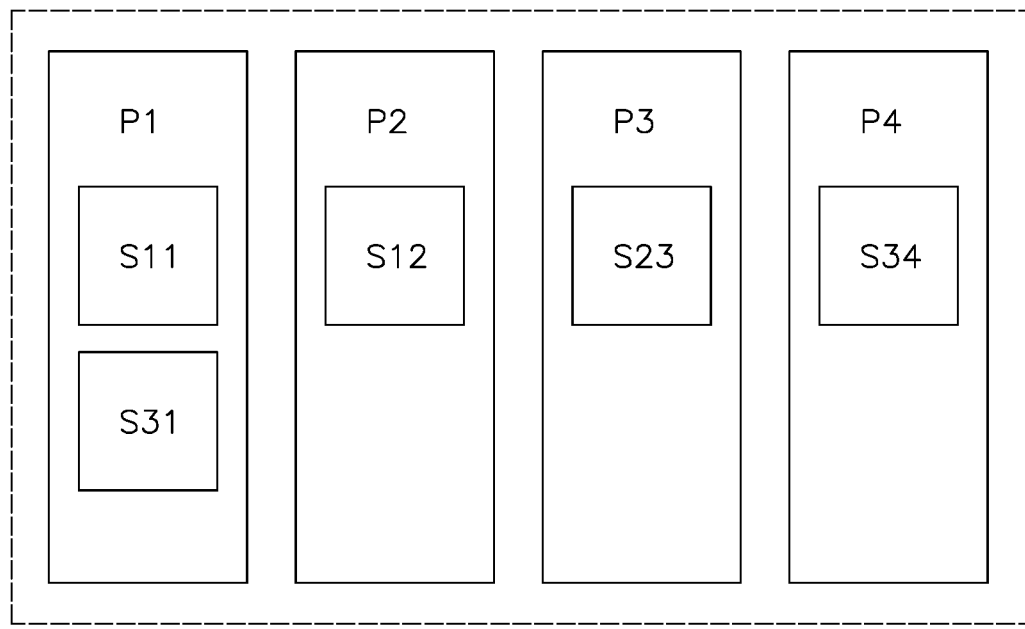
FIG. 5 is a structural perspective view of a signal segment combination of the present invention.

With reference to FIG. 5, in the present embodiment, the control module 20 assembles four signal segment combinations P1, P2, P3, and P4 into a signal sequence in corresponding order. Signal segment combination P1 includes signal segments S11 and S31, signal segment combination P2 includes signal segment S12, signal segment combination P3 includes signal segment S23, and signal segment combination P4 includes signal segment S34.

With reference to FIG. 6, signal segments S11 to S14, S21 to S24, and S31 to S34 each have corresponding parameters specifying characteristics as shown in FIG. 6. The following are definitions for the parameters:

Pattern identification (ID): defines which signal segment combination the signal segment belongs to, for example, signal segment S11 belongs to signal segment combination P1.

Segment ID: defines a unique identification number assigned to every signal segment S11 to S14, S21 to S24, and S31 to S34 for distinguishing each signal segment.

Algorithm; extracts characteristics out of each signal segment. For example, signal segment S11 uses an algorithm of any value, signal segments S31, S12, and S34 use an algorithm of averaging, and signal segment S23 uses an algorithm of accumulation respectively for extracting characteristics.

Threshold: defines a parameter used to specify the characteristics of the signal segments, for instance, a threshold for signal segment S11 is 10 Nm, for signal segment S31 is 5 km/h, for signal segment S12 is 20 Nm, for signal segment S23 is 720 degrees, and for signal segment S34 is 8 km/h.

Direction: either a positive direction or a negative direction regarding either more positive than the threshold or more negative than the threshold, in other words, specifying a definition of whether more than the threshold or less than the threshold.

According to the above definitions for the parameters, signal segment S1*l* of the torque signal of the crank, for instance, has characteristics defined as:

Any value of T(t) between t0 and t1 is more than 10 Nm.

When the control module 20 finishes Step 203, the control module 20 then proceeds to execute Step 204. In Step 204, the control module 20 attempts to match each of the signal segment combinations P1, P2, P3, and P4 to the verification data, as an attempt to verify the user's identity. For example, for signal segment S11 of the torque signal of the crank, if during the period of t0 to t1 any value exceeds 10 Nm, then the characteristic of the signal segment S11 matches the verification data, and vice versa. If all of the signal segment combinations P1, P2, P3, and P4 and all of the corresponding signal segments S11, S31, S12, S23, and S34 match the verification data, then the user is verified to be the bicycle owner.

As mentioned earlier, the verification data saved in the storing unit 23 by the control module 20 needs to be configured beforehand in the configuration mode. To configure the verification data, the human-machine interface 24 of the control module 20 provides a manual mode and a recording mode. In other words, the configuration mode includes the manual mode and the recording mode. By using the manual mode and through using the human-machine interface 24, the user is able to manually configure the amount of signal segment combinations used, as detailed in FIG. 6, and the time period used for generating the verification key, as detailed and dissected in FIG. 4 into time periods of t0 to t1, t1 to t2, t2 to t3, and t3 to t4. The user then directly configures the characteristics for each of the signal segments, for example the types of signal segments used, the algorithms used, the directions specified, and the thresholds used. The types of signal segments, for instance, may be a measurement of the torque of a crank, the angle of the crank position, and or a speed of the bicycle.

By using the recording mode and through guidance of the human-machine interface 24, the user would complete required actions to be recorded as the verification data. Such required actions include pedaling the pedals to make the crank turn, and ride the bicycle so that the bicycle moves at speed. Each sensing component of the sensing module 10 would then be able to obtain the sensing signals required for configuring the verification data.

Figure 7:
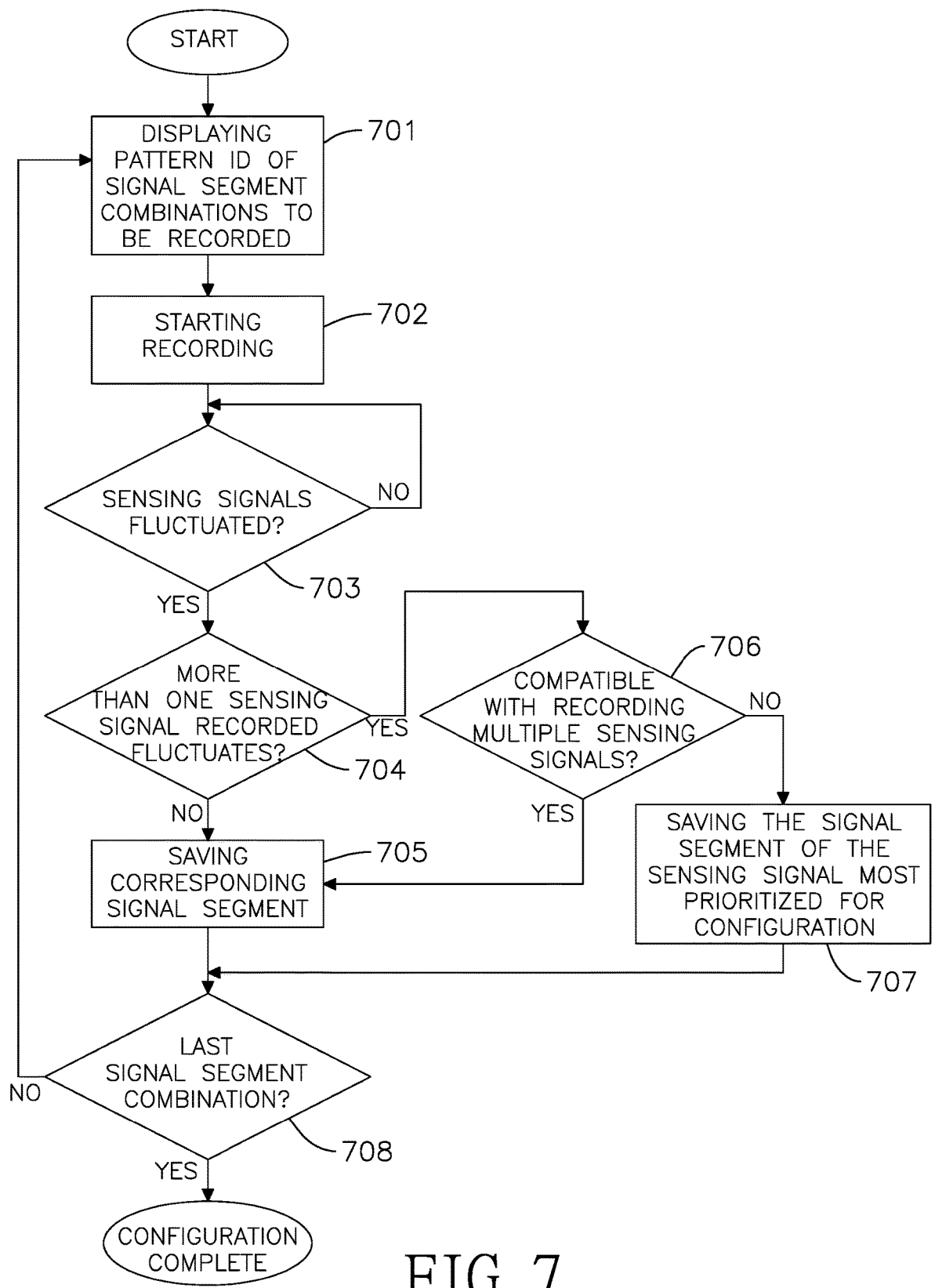
FIG. 7 is a flow chart of configuring verification data through a recording mode for the present invention.

With reference to FIG. 7, a flow chart of how the recording mode operates includes the following steps:

Step 701: displaying pattern ID of the signal segment combinations to be recorded.

Step 702: starting recording.

Step 703: determining whether the sensing signals recorded fluctuate. If the sensing signals recorded is constant, then re-executing step 703.

Step 704: if yes, then further determining whether more than one of the sensing signals recorded fluctuates.

Step 705: if only one of the sensing signals recorded fluctuates, then saving a corresponding signal segment.

Step 706: if indeed more than one of the sensing signals recorded fluctuates, then further determining whether the user verifying bicycle control system is compatible with recording multiple sensing signals.

If indeed the user verifying bicycle control system is compatible with recording multiple sensing signals, then saving multiple corresponding signal segments, as encompassed in step 705 in FIG. 7.

Step 707: if the user verifying bicycle control system is incompatible with recording multiple sensing signals, then saving the signal segment of the sensing signal that is most prioritized for configuration.

Step 708: determining whether the signal segment combination of current consideration is the last one.

If yes, then finish the recording process as the configuration for the verification data is complete. Otherwise, re-execute step 701 for the next signal segment combination of consideration.

In the present embodiment, the prioritization of the sensing signal can be configured through the human-machine interface 24.

Figure 8:
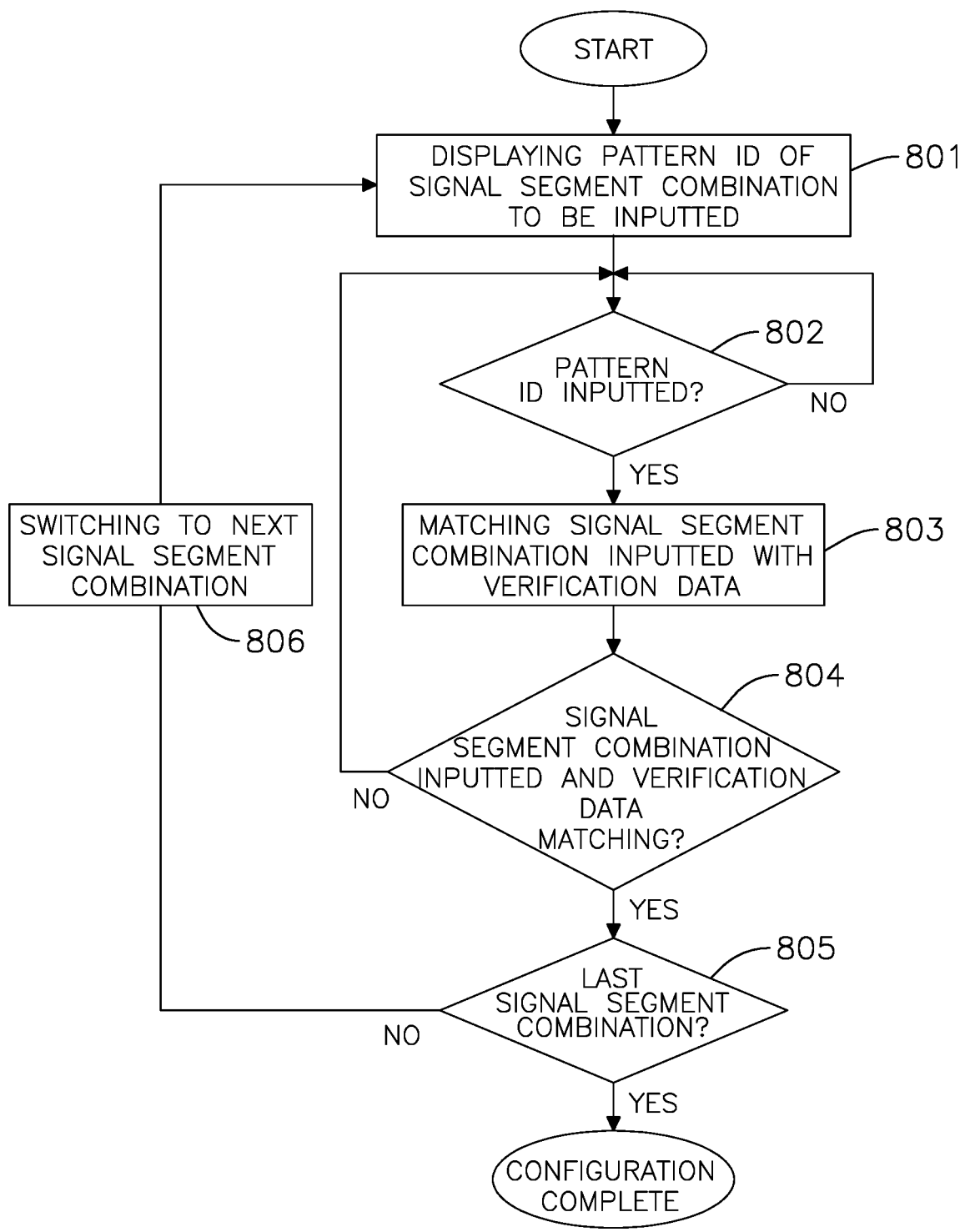
FIG. 8 is a flow chart to verify a user identity in the present invention.

With reference to FIG. 8, upon finishing the configuration, the user verifying bicycle control system is ready for using the user verification method. A flow chart to verify the user identity includes the following steps:

Step 801: displaying pattern ID of the signal segment combination to be inputted.

Step 802: determining whether pattern ID of the signal segment combination is inputted. If pattern ID of the signal segment combination is yet to be inputted, then repeating step 802.

Step 803: If yes, meaning the pattern ID of the signal segment combination is indeed inputted, then attempting to match the signal segment combination inputted with the verification data.

Step 804: determining whether characteristics of the signal segment combination inputted and the verification data match. If characteristics of the signal segment combination inputted and the verification data mismatch, then re-execute step 802.

Step 805: if yes, meaning the characteristics of the signal segment combination inputted and the verification data match, then further determining whether the signal segment combination of current consideration is the last one.

If yes, meaning the signal segment combination of current consideration is indeed the last one, then finishing verification for the user.

Step 806: if the signal segment combination of current consideration is yet the last one, then switching the signal segment combination of current consideration to the next signal segment combination of consideration, and re-executing step 801.

Figure 9:
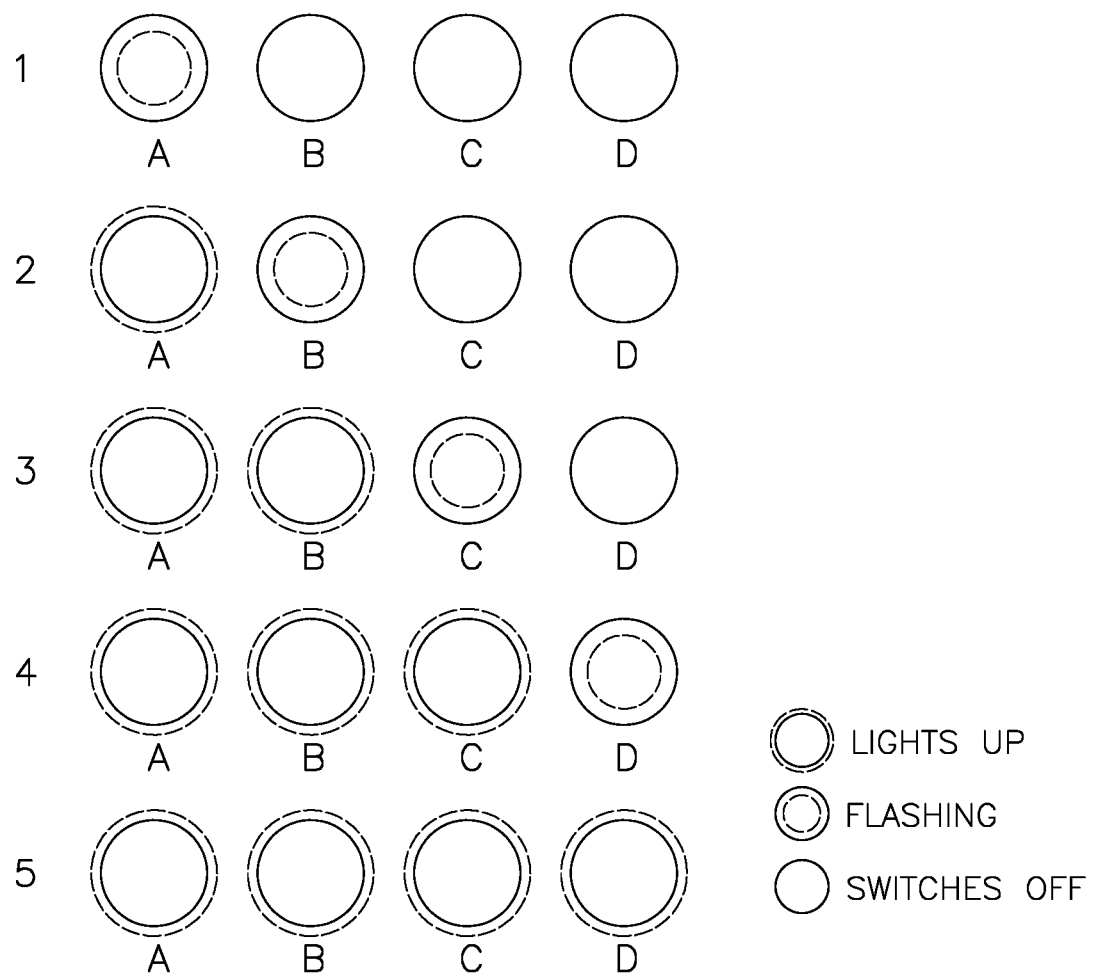
FIG. 9 is a perspective view of light signals for inputting a verification signal guided by a human-machine interface.

With reference to FIG. 9, a light signal perspective view details how the human-machine interface 24 guides the user to complete a process of user verification through different light signals. Particularly, the human-machine interface 24 has four respective light signals A, B, C, and D. When the user verifying bicycle control system is ready for user input, a first light signal A flashes, prompting the user to input a verification signal. At the same time, a second light signal B, a third light signal C, and a fourth light signal D are all off while the first light signal A flashes. After the verification signal of a first signal segment combination is inputted, the first light signal lights up, while the second light signal B flashes, and the third light signal C and the fourth light signal D are off, prompting the user to input the verification signal of a second signal segment combination. Once the second signal segment combination is inputted, the first light signal A and the second light signal B light up, while the third light signal C flashes and the fourth light signal D is off, prompting the user to input the verification signal of a third signal segment combination. Similarly, once the third signal segment combination is inputted, the first light signal A, the second light signal B, and the third light signal C light up, while the fourth light signal D flashes, prompting the user to input the verification signal of a fourth signal segment combination. Once the verification signals of all signal segment combinations are inputted, the first light signal A, the second light signal B, the third light signal C, and the fourth light signal D all light up, signaling the process of user verification is successfully completed.

During the process of user verification described above, if either characteristic of the verification signal inputted by the user fails to match the verification data or an awaiting input period has expired, the user can await the light signals to turn for prompting another input again. However, once the user verifying bicycle control system fails to verify the user after a set number of times, the user verifying bicycle control system will have a lockdown, ending the process of user verification. The set number of times before the lockdown can be programmed by a system manager of the user verifying bicycle control system of the present invention.

In conclusion, the sensing module 10 of the present invention first obtains the sensing signals such as the speed signal, the torque signal, and/or the angle signal, then outputs the sensing signals to be dissected into the signal segments by the control module 20. The signal segments are then assembled into the signal segment combinations for generating the key to verify the user identity. Sensing units, for instance such as the speed sensing unit 13 or the torque sensing unit 121, of the sensing module 10 can be found often on bicycles nowadays. Such sensing units have low integration cost and can be easily integrated to the bicycle. Since the key to verify the user identity is defaulted by the user, in other words, since the amount of signal segments used and the characteristics used for the signal segment combinations are configured by the user, the key is safe and hard to be cracked.

What is claimed is:

1. A user verifying bicycle control system, comprising a sensing module and a control module, wherein the sensing module further comprises:
    a first processing unit;
    a crank sensing component, connecting the first processing unit, for sensing a torque and/or an angle of a crank of a bicycle; and
    a speed sensing unit, connecting with the first processing unit for sensing a bicycle speed to obtain a speed signal, and outputting the speed signal to the first processing unit; wherein
    the sensing module connects with the control module, and provides multiple sensing signals to the control module;
    the control module receives the sensing signals from the sensing module, and assembles the sensing signals to form a signal sequence;
    the signal sequence mainly consists of at least one signal segment combination, and each signal segment combination includes at least one signal segment with characteristics;
    the sensing signals assembled into the signal sequence include senses of the torque and/or the angle of the crank from the crank sensing component; and
    the control module uses the signal sequence as a key for verifying; the control module matches characteristics of the at least one signal segment in the at least one signal segment combination to verify a user identity.

2. The user verifying bicycle control system as claimed in claim 1, wherein the sensing module further comprises a tilt sensing unit and a brake sensing unit, and both the tilt sensing unit and the brake sensing unit are connected to the first processing unit respectively.

3. The user verifying bicycle control system as claimed in claim 1, wherein the control module comprises a second processing unit, a storing unit, and a human-machine interface, and both the storing unit and the human-machine interface are connected to the second processing unit respectively.

4. The user verifying bicycle control system as claimed in claim 3, wherein the storing unit of the control module mainly consists of non-volatile memory;
    wherein the human-machine interface comprises a touch screen, a voice input, and/or at least one button.

5. The user verifying bicycle control system as claimed in claim 1, wherein the sensing module further comprises a first port, and the control module further comprises a second port; wherein the second port and the first port are compatible.

6. The user verifying bicycle control system as claimed in claim 2, wherein the sensing module further comprises a first port, and the control module further comprises a second port; wherein the second port and the first port are compatible.

7. The user verifying bicycle control system as claimed in claim 3, wherein the sensing module further comprises a first port, and the control module further comprises a second port; wherein the second port and the first port are compatible.

8. The user verifying bicycle control system as claimed in claim 4, wherein the sensing module further comprises a first port, and the control module further comprises a second port; wherein the second port and the first port are compatible.

9. A user verification method, executed by a control module of a user verifying bicycle control system, wherein the user verification method comprises the following steps:
- receiving multiple sensing signals within a time period;
- dissecting each of the sensing signals into multiple signal segments;
- assembling at least one of the multiple signal segments to form at least one signal segment combination; and
- matching characteristics of the at least one signal segment in the at least one signal segment combination to verify a user identity;
- wherein the sensing signals include senses of a torque and/or an angle of a crank of a bicycle from a crank sensing component electrically connected to the control module.

10. The user verification method as claimed in claim 9, wherein more than one said signal segment combination is combined into a signal sequence.

11. The user verification method as claimed in claim 9, wherein each signal segment comprises parameters as follows:
- a pattern identification, defining the signal segment combination to which the signal segment belongs;
- a segment identification, defining a unique identification number assigned to each of the signal segments;
- an algorithm, used to extract the characteristics out of each signal segment;
- a threshold;
- a direction, either a positive direction or a negative direction.

12. The user verification method as claimed in claim 9, further comprising:
- a recording mode, providing a user to configure a verification data; wherein the recording mode further comprises steps of:
- displaying the pattern identification of the at least one signal segment combination to be recorded;
- starting recording;
- determining whether the sensing signals recorded fluctuate; if yes, then saving a corresponding signal segment;
- determining whether the signal segment combination of current consideration is the last one; if yes, finishing the recording process, otherwise, re-executing the step of displaying the pattern identification of the at least one signal segment combination to be recorded.

13. The user verification method as claimed in claim 12, wherein after determining whether the sensing signals recorded fluctuate, further determining whether more than one of the sensing signals recorded fluctuates; if only one of the sensing signals recorded fluctuates, then saving multiple corresponding signal segments.

14. The user verification method as claimed in claim 13, wherein after determining whether more than one of the sensing signals recorded fluctuates, further determining whether the user verifying bicycle control system is compatible with recording multiple sensing signals; if incompatible, saving the signal segment of the sensing signal that is most prioritized for configuration.

15. The user verification method as claimed in claim 12, further comprising a manual mode, providing the user to configure the verification data manually.

\* \* \* \* \*